March 31, 1964   J. P. MARX ETAL   3,126,934
NUT LOCKING STRUCTURES
Filed May 22, 1961
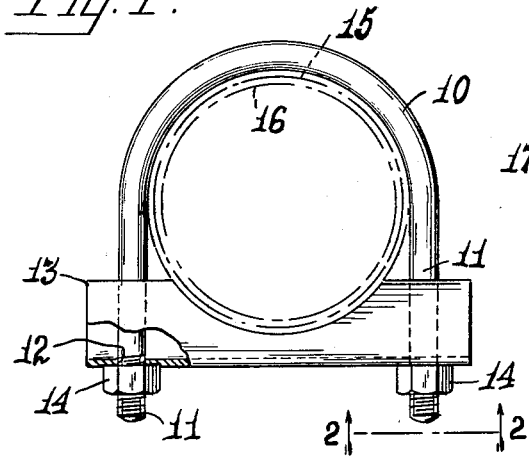
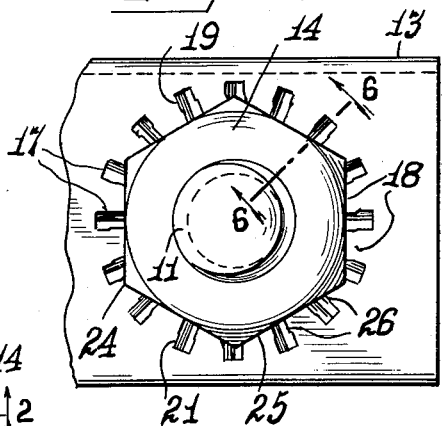
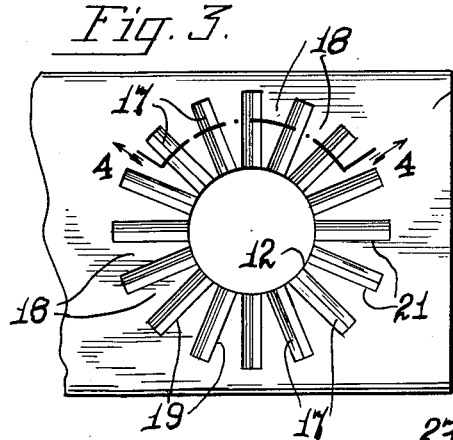
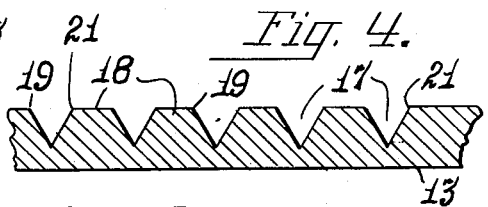
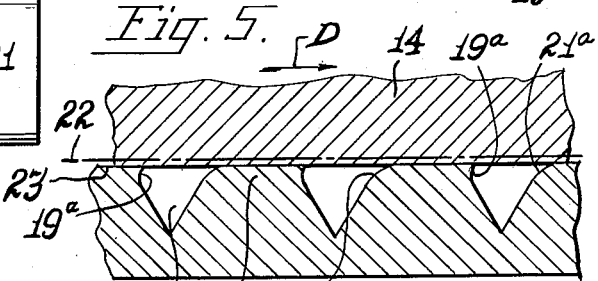
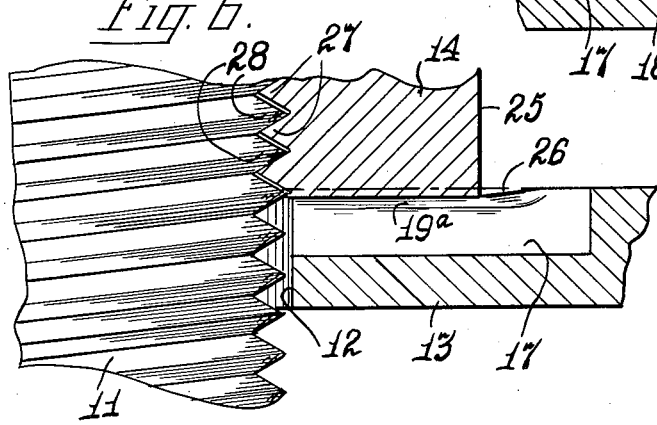
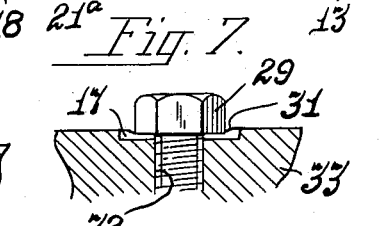
INVENTOR.
JOSEPH P. MARX and
BY WILLIAM L. DAUBNER.
Attorney United States Patent Office 3,126,934
Patented Mar. 31, 1964

3,126,934
NUT LOCKING STRUCTURES
Joseph P. Marx and William L. Daubner, both of Hartford, Wis.; said Daubner assignor to said Marx
Filed May 22, 1961, Ser. No. 111,811
2 Claims. (Cl. 151—34)

The invention relates to improvements in means for securely locking a threaded nut to resist its backing off of a stud upon which it is threaded.

More particularly the invention relates to the provision of novel means on a surface against which a conventional threaded nut is drawn tightly to prevent said nut from becoming loosened by reason of vibration, or for any reason other than intentional loosening of same. Such means as is disclosed herein in an exemplary form avoids the need for the use of special forms of self locking nuts, lock washers, or other auxiliary lock washers, or other auxiliary locking devices. Lock washers of any kind whatsoever are particularly objectionable when they are used in association with nuts applied to the clamp bolt of a clamp assembly primarily because of the added cost of the washer and the fact that such washers are made from special hardened spring steel and subject to fracture. This is of special importance in the use of clamps employed to join exhaust system components, such as an exhaust pipe and a muffler. In such installations the loss of lockwashers through breakage results in a loosened connection and consequent leakage of poisonous exhaust fumes. Such loss also results in annoying rattle even if the nut is prevented from separating entirely from the bolt or clamp because of rust formation.

Various known types of self-locking nuts are nonstandard, are relatively expensive and further provide for a disproportionate amount of friction contact between the threads of the nut and the threads on the bolt or stud. Although such nuts have special advantages in specific applications they have the disadvantage of being able to be turned by hand only until thread-friction sets in after which a tool must be used even though the nut may have to be turned many times before contacting the surface against which it is to be tightened. Also should disassembly be required, a tool must be used to remove them entirely from the bolt or stud.

In muffler-exhaust pipe assemblies, as well as in many other types of assemblies, it is frequently desirable and certainly advantageous to permit the nut to be turned freely on the bolt or stud, without the use of a tool, into surface contact with the surface against which it is ultimately to be tightened. A tool may then be used only for final tightening and, if disassembly is required, such tool is needed only to loosen the nut after which it can be spun off of the bolt freely.

Most known types of self locking threaded assemblies have the common disadvantage of requiring the user to rely upon special tools; use special hardened spring steel lock washers; or use nuts designed for special bolts or studs, all of which are more expensive than similar standard parts.

Among special tools now commonly in use are impact wrenches which operate to deliver a constant force throughout their working cycle. While the use of such power tools reduces the time loss in assembly operations they frequently cause a severe twisting shock to be delivered to the bolt or to the stud upon which a nut is tightened. This occurs even when a spring steel lock washer is present between the bolt head or nut and the engaged surface. Such lock washers are gradually forced under the tightening pressure into a flat unyielding position lacking impact absorption qualities. When this point of tightening is reached, the full force of the impact wrench is delivered to the bolt head or nut against a solid unyielding surface, and because there no longer is present any impact absorption, the load is delivered directly to the stud with sufficient suddenness and force as to cause the stud to fracture and twist off. The likelihood of this occurring in use of the herein disclosed structure is avoided due to the provision of a resiliently compressible surface in the area of the nut engaged surface which affords cushioning means for the tightened bolt or nut so as to absorb any sudden shock of a kind that would tend to fracture the bolt or stud thus affording sufficient time lapse to enable the operator to turn off the power before the critical point of bolt or stud fracture is reached.

It is therefore an object of the invention to provide locking means of the character herein disclosed which overcomes the disadvantages hereinabove recited and which affords novel means embodying novel structural and functional characteristics not present in known prior assemblies and structures.

Another object of the invention is to provide novel means in the surface against which a conventional nut is to be drawn up tightly, for providing frictional resistance to loosening of the nut.

Another object is to provide a novelly formed surface for nut engagement, at least a part of which is capable of being resiliently deformed under the applied pressure of a nut drawn up tightly thereagainst, so as to maintain resilient pressure against said nut at all times and therefore frictionally and mechanically resisting its displacement.

Another object is to provide a lock nut assembly of a kind that permits free rotation of said nut while threading same onto a bolt or stud through substantially the entire distance required to bring said nut into engagement with the surface against which it is to be tightened.

Another object is to provide a clamp element with novel means to cooperate with a nut for securing said nut in place when drawn up tightly thereagainst.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is a side elevational view of a novel saddle clamp of a type used for joining two tubular members such as for example an exhaust pipe to the tubular end fitting of a muffler, both members being illustrated in dot-dash lines, and showing the saddle clamp element thereof partially broken away.

FIG. 2 is an enlarged elevational view of a portion of the clamp saddle showing one of the lock nut assemblies, as viewed along line 2—2 of FIG. 1.

FIG. 3 is a view similar to FIG. 2 showing the clamp saddle before application of a nut thereto.

FIG. 4 is an enlarged detail sectional view taken substantially on line 4—4 of FIG. 3.

FIG. 5 is a still larger fragmentary detail sectional view, similar to FIG. 4, but showing a nut in tight surface engagement with the clamp saddle surface.

FIG. 6 is an enlarged fragmentary sectional view of the assembly, taken substantially on line 6—6 of FIG. 2.

FIG. 7 is a sectional view illustrating the invention in association with use of a hex-bolt.

Referring to the accompanying drawings and particularly to the FIG. 1 disclosure, the features of the invention are shown embodied in a clamp device of a character used for clamping an exhaust pipe of an internal combustion engine to a muffler. The clamp device shown comprises a U-bolt 10 having threaded legs 11 which are extended through apertures 12 in a saddle clamp element 13. The elements 13 is fabricated from mild steel plate into a substantially U-shape in transverse section. When assembled with U-bolt 10, conventional nuts 14 are threaded onto the projecting ends of legs 11 and are drawn up tightly to clamp tubular members 15—16 together tightly and prevent exhaust leakage. It should be evident that should nuts 14 become loosened or fall off, the required tight clamping offset of the tubular members is lost and dangerous fumes may escape or, at best, the assembly develops an annoying rattle.

The present invention has as its purpose the provision of novel means in the saddle clamp element to prevent backing off of the tightened nuts 14. Although the features of the invention herein described are illustrated in connection with clamp devices for mufflers, the invention may be incorporated in any other structure requiring firm securement of a conventional nut after it is drawn up tightly against a plane clamping surface. The means herein disclosed involves the provision of a series of mutually spaced grooves 17, preferably V-shaped in section, which extend outwardly radially from aperture 12 and open onto the surface of the element 13 against which the nut is to be tightened, which surface is planar. These grooves 17, best shown in FIG. 3, preferably are of uniform width and depth throughout their length and they are of a length to extend beyond the largest diameter of the applied nut. The spaces between grooves 17 define radial ribs 18 having sloping side faces and flat top surfaces, the latter being disposed in the plane of said planar surface against which the nut is to be tightened.

The saddle clamp, or other item or surface area bearing the grooves and ribs is fabricated from mild steel which is malleable and hence not subject to fracture, and which retains a limited amount of elasticity. Such material will deform under applied pressure and change its shape and, when the pressure is removed, it will, within the limits of its elasticity, return to its original shape. Because of this inherent elasticity in the material it is possible to tighten the nut sufficiently to cause the radiating edges 19—21 between the flat top surfaces and the sloping sides of the ribs 18 to be deformed, in a manner to be more precisely described hereinafter, to produce tensioned surface areas beneath and around the nut to resist its backing away from the surface and also to urge the threads in the nut to attain a high degree of frictional contact with the engaged threads on the bolt leg 11.

More specifically, after the nut 14 has been threaded freely onto stud or leg 11 and is carried into initial surface contact with the underlying surface of ribs 18, a tool is applied for tightening said nut. Continued rotation of the nut, in the clockwise direction indicated by arrow D in FIG. 5, increases the frictional engagement of the nut with the planar top surfaces of the ribs 18 and causes stretching and horizontal disclocation of the material in at least a portion of the top surface of each rib so as to carry the edges 19 in such direction to produce a slight overhang of said edge into the area of the related groove 17, as indicated at 19a in FIG. 5. At the same time the opposed edge 21 of each groove 17 is compressed, as indicated at 21a in FIG. 5, thus carrying it in a direction away from its normal plane. Because of the inherent resiliency of the material of the ribs these displaced edges seek to return to their original positions.

While this is occurring, continued tightening of the nut on stud leg 11 exerts a vertical compressive force on the top surfaces of said ribs 18 within the area underlying the nut. This compressive action assists circumferential displacement of the edges 19—21 and at the same time allows the nut to form a seat or nest in the rib surfaces. This is perhaps best illustrated in FIGS. 5 and 6 where the dot dash line 22 represents the normal plane surface of said ribs, whereas the newly created surface of the seat or nest is indicated at 23.

A further and important material displacement occurs during application of the rotational and vertical compressive forces hereinabove referred to. This combination of forces causes material displacement outwardly radially on the rib surfaces and, to such degree that the edges and surface areas of the ribs distorted and compressed during movement of the corner portions 24 of nut 14 thereover and now lying in the region of the flat sides 25 of said tightened nut return substantially to their initial elevated position and establish mechanical barriers 26 to resist rotation of the nut in a direction to loosen same.

There is thus generated a plurality of forces all operating to resist loosening of a tightened nut. These forces are; (1) the mechanical barriers 26 hereinabove referred to; (2) the resistance to counter rotation offered by biting effect of the resiliently distorted edges 19a of the grooves and (3) the vertical compressive force of the compressed rib surfaces 23. This latter force urges the threads 27 of nut 14 into tight frictional contact with the opposed faces of threads 28 on threaded stud 11, as best shown in FIG. 6.

FIG. 7 is illustrative of use of the features of the invention in association with a conventional hex-bolt 29 wherein the circular area 31 surrounding a tapped opening 32 in a resiliently compressible body 33 is formed with the radiating grooves and ribs hereinabove described in detail. Thus, it will be appreciated that the expression "polygonally shaped compression means on the bolt" as used in the claims is intended to cover both the polygonally shaped head of said hex-bolt 29 and the conventional hex-nut 14 which threads on to the legs of the bolts according to the FIGS. 1–6 form of fastening means.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

Having thus described the invention, what is claimed as new and desired to be secured by Letters Patent of the United States is:

1. In an assembly of the character described, in combination, a fastened member having a planar surface, a threaded fastening bolt extending through a hole provided therefor in said member and which opens through said surface, a laterally extending, polygonally shaped compression means on the bolt and being drawn into tight engagement with said surface, and means on said surface for preventing said compression means from becoming unintentionally unloosened comprising a plurality of circumferentially spaced grooves in and opening onto said surface and which extend radially outwardly from said bolt hole and define radial ribs on said surface, said grooves being of uniform width and depth throughout their length whereby the width of the ribs increases progressively in accordance with their radial length, there being one such rib disposed between each two adjacent grooves and each said rib having spaced side faces and a flat top surface extending therebetween which is disposed in the plane of said planar surface, said ribs having radial length greater than the greatest diameter of said compression means, and the material of at least the ribs being more malleable than that of the compression means whereby tightening of said means against the surface as aforesaid effects compressive deformation of said ribs in vertical, circumferential and radial directions in a manner and to a degree such that they effectively resist turning of said compression means in unloosening direction.

2. An assembly according to claim 1, wherein the grooves are V-shaped in section and the side faces of the ribs are sloped in relatively downward-outward direction.

References Cited in the file of this patent

UNITED STATES PATENTS

| | | |
|---|---|---|
| 570,354 | Turner | Oct. 27, 1896 |
| 892,834 | Huffman | July 7, 1908 |
| 1,581,559 | Williams | Apr. 20, 1926 |
| 2,959,834 | Graham | Nov. 15, 1960 |

FOREIGN PATENTS

| | | |
|---|---|---|
| 813,333 | Germany | Sept. 10, 1951 |
| 560,055 | Italy | Mar. 30, 1957 |